United States Patent Office 3,001,120
Patented Sept. 19, 1961

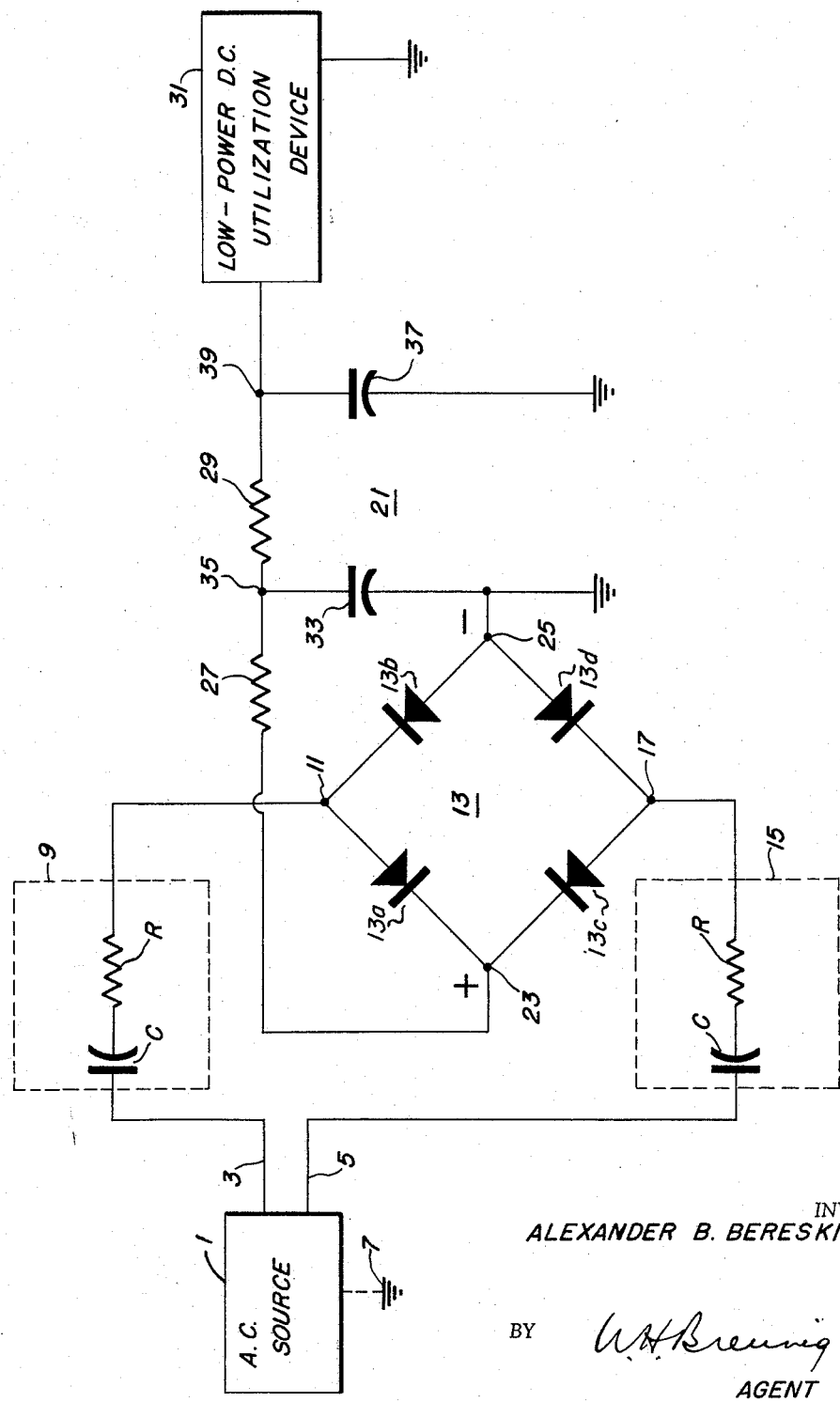

3,001,120
POWER SUPPLIES
Alexander B. Bereskin, Cincinnati, Ohio, assignor to The Baldwin Piano Company, Cincinnati, Ohio, a corporation of Ohio
Filed Oct. 16, 1957, Ser. No. 690,461
20 Claims. (Cl. 321—8)

The present invention relates generally to alternating to direct current converters, and more particularly to transformerless low-cost A.C. to D.C. converters which are particularly adapted for safely supplying D.C. power to low-power circuits, such as transistor devices and which have the property that connection of various points of the D.C. side of the converter to either A.C. supply line does not impair the operation of the converter nor appreciably change its D.C. output current.

Briefly describing a preferred embodiment of the present invention I employ a bridge-type full-wave rectifier, connected to a power utilization device via an RC filter at two opposed bridge output terminals, and coupled to an A.C. source at two further bridge input terminals. The coupling between the A.C. source and the bridge-type rectifier includes an impedance between each side of the A.C. supply and a bridge input terminal, the impedance preferably including a series capacitor. More specifically, such capacitor may be in series with a current limiting resistance. The capacitor then provides D.C. isolation, and the combination of capacitor and resistance constitutes a D.C. isolating current limiting impedance. Some of the advantages of the present invention may nevertheless be derived by employing, as a current limiting impedance, solely resistances selected to limit current flow from each side of the A.C. supply to the bridge rectifier. In the alternative, a condenser alone may be employed, provided it has sufficient reactance and power handling capability at the power frequency. Utilization of series resistance and capacity enables effective circuit design employing a relatively low cost capacitor, to provide the desired value of impedance, and also to assure D.C. isolation and hence security against shock to personnel.

In operation, when neither A.C. input line is grounded, and assuming that the load and hence one bridge rectifier output terminal is connected to ground, the bridge rectifier acts as a full wave rectifier and is in series with both impedances. When either A.C. input line is grounded, on the other hand, the bridge rectifier operates as a half-wave rectifier, and one of the impedance is shorted. In consequence, total current flow to the load is the same when neither input line is grounded as when either of the input lines is grounded.

It is, accordingly, a broad object of the present invention to provide an A.C. to D.C. converter for low power level applications in which danger of shock to personnel is minimized.

It is a further object of the present invention to provide a simple, small, inexpensive, safe power supply for supplying low level power, suitable for energizing transistor devices and the like.

It is another object of the invention to provide a transformerless rectifier power supply including a full wave bridge rectifier, and which delivers the same value of current to a load when one bridge rectifier output terminal is connected directly with either A.C. power input line, or to neither.

A further object of the present invention resides in the provision of a transformerless rectifier system for supplying a load, one point of which is grounded, in which the same current is supplied to the load when either A.C. input line is grounded as when neither is grounded.

The above and still further objects, features and advantages of the present invention will become apparent upon consideration of the following detailed description of one specific embodiment thereof, especially when taken in conjunction with the accompanying drawings, wherein:

The single figures of the drawings is a schematic circuit diagram of a preferred embodiment of a system according to the present invention.

Referring now more specifically to the accompanying drawings, the reference numeral 1 denotes a single phase A.C. source such as terminals connected to a conventional 60 cycle per second power line. It is common but not essential, in such supplies, to have one of the supply leads, as 3 or 5, grounded. For the sake of generality, a ground 7 has accordingly been indicated as applied (dotted) to the A.C. source 1, rather than specifically to either lead 3 or 5.

The lead 3 is connected via an impedance 9 to one terminal 11 of a full wave bridge rectifier 13, comprising rectifiers 13a, 13b, 13c and 13d, the lead 5 being similarly connected via impedance 15 to an opposite terminal 17 of bridge rectifier 13. Impedances 9 and 15 are preferably identical, and each consists of a condenser C and a resistance R in series. In a preferred embodiment of the present invention condenser C may have a value 0.06 microfarad, and resistance R a value of 6800 ohms, when type 1N34A diodes are employed in bridge rectifier 13. This combination of values makes available 1.1 ma. of output current, output voltage being a function of the equivalent D.C. resistance of the load or utilization device connected to the A.C. to D.C. converter of the invention.

A filter 21 is connected across points 23, 25 of bridge rectifier 13, and points 23, 25 being conjugate to points 11, 17 the bridge rectifier 13 supplies full wave rectified current to the filter 21. The latter is a conventional RC low pass filter designed effectively to smooth 60 c.p.s. current, and comprises two resistances 27, 29 in series between point 23 of bridge rectifier 13 and a load or utilization device 31 (which may be specifically a transistor device or amplifier) a filter condenser 33 being connected from the junction 35 of resistances 27 and 29 to ground, and a further filter condenser 37 from the junction 39 of resistance 29 and load or utilization device 31 to ground.

One side of load or utilization device 31 may be connected to ground, as may also point 25 of bridge rectifier 13.

Describing now the operation of the present system, if we assume that A.C. source 1 is not grounded, when lead 3 goes positive current flows through impedance 9 to point 11, from point 11 to point 23, and from point 23 to filter 21. Point 23 is then at positive potential. The return path is from ground to point 25 of bridge 13, thence to point 17, and via impedance 15 to lead 5. When lead 5 is positive, on the other hand, current flows through impedance 15 to point 17 of bridge rectifier 13, and thence to point 23, and to filter 21, the return path being now from ground and point 25 to point 11, and thence via impedance 9 to lead 3. It is important to note that the current supplied by A.C. source 1 passes through impedances 15 and 9 in series, and assuming impedances 15 and 9 to be identical a voltage drop is developed between leads 3 and 5 equal to twice the voltage drop which develops in either impedance alone.

If it be assumed that lead 5 is grounded, a positively going half cycle voltage on lead 3 causes current flow to filter 21 via impedance 9, point 11 and point 23. Current return is directly from ground at the load side of the rectifier to grounded lead 5, impedance 15 and rectifier 13d being by-passed. Since the impedance 15 is by-passed, the current flowing is essentially twice the normal value. When lead 3 is negative, no current flows to the load. The current instead flows from point 25 through rectifier 13b to point 11 and through impedance 9 to lead 3. It follows that current to the load flows via only one of impedances, 9, 15, in the latter case, and not in both. However, as far as the load is concerned only half-wave rectification is accomplished, rather than full wave rectification, but since the pulse of current has twice its previous amplitude, the net current flow is substantially the same whether or not lead 5 is grounded.

Assuming lead 3 to be grounded and lead 5 ungrounded, current flows to the filter 21 when lead 5 is positive, via impedance 15, point 17, rectifier 13c, and point 23. The return path from the load proceeds from ground at the load side of the system directly to grounded lead 3, by-passing impedance 9 and rectifier 13b. When lead 5 goes negative no power is delivered to the filter, but current flows from ground to point 25 through rectifier 13d to point 17 and through impedance 15 to lead 5.

It follows from the above discussions that the bridge rectifier 13 operates as a full wave rectifier in series with 2Z, where Z is the impedance value of either impedance 15 or 9, when both lead 3 and lead 5 are ungrounded. Grounding of either lead 3 or lead 5 effects a modification of mode of operation from full wave to half wave rectification, with concomitant reduction in series impedance from 2Z to Z, so that total average current flow to the load is not substantially changed.

The condensers C in the impedances 9 and 15 serve to isolate the A.C. lines 3 and 5 from the D.C. voltage at the output side of the filter, so that no D.C. leakage can occur, whether or not bridge rectifier 21 has leakage, and despite defects in wiring which may inadvertently exist. Danger of shock to operating personnel due to discharge of filter condensers, or the like, is thereby reduced. The presence of the impedances, 9, 15 in the circuit, of itself, tends to reduce danger of shock at the D.C. side of the system, since these impedances reduce current flow and absorb voltage. Similarly, current flow and voltage at the D.C. side of the system are reduced by the impedances, and surges reduced when the system is initially energized.

While I have described and illustrated one specific embodiment of my invention, it will be clear that variations of the details of construction which are specifically illustrated and described may be resorted to without departing from the true spirit and scope of the invention as defined in the appended claims.

What I claim is:

1. A D.C. power supply operative from two A.C. lines to supply a relatively low impedance load comprising, a full wave bridge rectifier, said bridge rectifier having two input terminals for alternating current and having output terminals conjugate to said input terminals, one of said output terminals being connected to ground, a first relatively high current limiting impedance connected in series between one of said input terminals and one of said two A.C. lines, and a second relatively high current limiting impedance connected in series between the other of said input terminals and the other of said two A.C. lines, the impedance of said load and of said current limiting impedances being taken at the fundamental frequency of said A.C. lines.

2. A D.C. power supply according to claim 1, wherein said impedances are substantially equal.

3. A D.C. power supply according to claim 1, wherein each of said impedances includes a series capacitor.

4. A D.C. power supply according to claim 1, wherein each of said impedances includes a series resistor.

5. A D.C. power supply according to claim 1, wherein each of said impedances is a series circuit including a capacitor and a resistance.

6. A D.C. power supply according to claim 1, wherein said impedances are substantially equal and wherein each of said impedances is a series circuit comprising a capacitor and a current limiting relatively high resistance.

7. An A.C. to D.C. converter supplied by two A.C. lines supplying A.C. power at a fundamental frequency, and arranged for feeding a load via two output terminals, said converter including a full wave bridge rectifier comprising four diodes, said bridge rectifier having two input terminals, said bridge rectifier having two conjugate load connected points connected to said two output terminals, one of said load connected points being grounded, a first current limiting impedance connected in series between one of said two A.C. lines and one of said two input terminals, a second current limiting impedance connected in series between the other of said two A.C. lines and the other of said two input terminals, said current limiting impedances being substantially equal, said current limiting impedances having values in comparison with the impedance of said load such that load current is substantially constant for both grounded and ungrounded condition of either one of said two A.C. lines, the values of said current limiting impedances being taken at said frequency f, 8. The combination according to claim 7, wherein each of said impedances includes a series capacitor.

9. The combination according to claim 8, wherein each of said impedances includes in series a D.C. isolating capacitor and a current limiting resistance.

10. A D.C. power supply operative from two A.C. lines supplying A.C. power of predetermined fundamental frequency to supply a relatively low impedance load comprising, a full wave bridge rectifier, said bridge rectifier having two input terminals for alternating current and having output terminals conjugate to said input terminals, one of said output terminals being connected to ground, a first relatively high current-limiting impedance when taken at said fundamental frequency connected in series between one of said input terminals and one of said two A.C. lines, and a second relatively high current-limiting impedance when taken at said fundamental frequency connected in series between the other of said input terminals and the other of said two A.C. lines, said current limiting impedances having each a value of at least two hundred ohms at said fundamental frequency, the relative values of said relatively low impedance load and of said current limiting impedances being such that D.C. power supplied by said power supply is determined substantially entirely by the values of said current limiting impedances.

11. A D.C. power supply according to claim 10, wherein said impedances are substantially equal.

12. A D.C. power supply according to claim 10, wherein each of said impedances includes a series capacitor.

13. A D.C. power supply according to claim 10, wherein each of said impedances includes a series resistor.

14. A D.C. power supply according to claim 10, wherein each of said impedances is a series circuit including a capacitor and a resistance.

15. A D.C. power supply according to claim 10, wherein said impedances are substantially equal and wherein each of said impedances is a series circuit comprising a capacitor and a current limiting relatively high resistance.

16. An alternating to direct current converter for operating between two A.C. lines and a relatively low impedance load requiring relatively constant direct current, and wherein said current is required to have approximately the same value whether or not either of said two A.C. lines is grounded, said converter comprising, a full wave bridge rectifier, said full wave bridge rectifier having two input terminals connected to said two A.C. lines respectively, and having two output terminals conjugate to said input terminals, said two output terminals being connected to said load and one of said two output terminals being grounded, a first current limiting impedance connected in series between one of said A.C. lines and one of said input terminals, a second current limiting impedance connected in series between the other of said A.C. lines and the other of said input terminals, said impedances being substantially equal and having each a relatively high value of impedance and selected to afford said relatively constant direct current for both grounded and ungrounded condition of one of said A.C. lines.

17. The combination according to claim 16 wherein each of said impedances includes a relatively high series resistance.

18. The combination according to claim 16 wherein each of said impedances includes a relatively high series resistance in series with a blocking capacitor.

19. A D.C. power supply operative from two A.C. lines to supply a relatively low impedance load having relatively low impedance and requiring a substantially constant value current, comprising a full wave rectifier having input terminals and connected to said two A.C. lines, said full wave rectifier being arranged to provide full wave current to said load, and substantially equal relatively high impedances connected each between one of said A.C. lines and one of said input terminals, the relative values of said relatively high impedances and of said relatively low impedance load being such that said relatively high impedances operate as current limiting impedances to establish substantially the value of said substantially constant current, whereby disablement of one side of said full wave rectifier leaves the value of said current at said substantially constant value.

20. The combination according to claim 19 wherein said relatively high impedances are at least in major part resistive.

References Cited in the file of this patent

UNITED STATES PATENTS

| | | |
|---|---|---|
| 972,892 | Meyer | Oct. 18, 1910 |
| 2,539,100 | Rado | Jan. 23, 1951 |
| 2,781,479 | Rice | Feb. 12, 1957 |
| 2,797,381 | Schmidt | June 25, 1957 |